United States Patent [19]

Lindemann et al.

[11] Patent Number: 4,616,057

[45] Date of Patent: Oct. 7, 1986

[54] POLYMER EMULSION CONTAINING AN INTERPENETRATING POLYMER NETWORK

[75] Inventors: Martin K. Lindemann, Greenville; Kim Deacon, Rockhill, both of S.C.

[73] Assignee: Sun Chemical Corporation, New York, N.Y.

[21] Appl. No.: 753,685

[22] Filed: Jul. 10, 1985

[51] Int. Cl.⁴ .................................................. C08K 3/20
[52] U.S. Cl. .................................. 524/458; 523/222; 525/903
[58] Field of Search .................. 524/458; 523/222; 525/903

[56] References Cited

U.S. PATENT DOCUMENTS

| | | | |
|---|---|---|---|
| 2,392,585 | 1/1946 | Fryling | 524/458 |
| 2,754,280 | 7/1956 | Brown et al. | 525/329.6 |
| 3,236,798 | 2/1966 | Dunnavant et al. | 524/458 |
| 3,426,101 | 2/1969 | Ryan et al. | 260/876 |
| 3,671,610 | 6/1972 | Amagi et al. | 260/880 R |
| 3,732,184 | 5/1973 | Lindemann et al. | 526/87 |
| 3,833,404 | 9/1974 | Sperling | 117/63 |
| 4,119,746 | 10/1978 | Bleyle | 524/458 |
| 4,122,136 | 10/1978 | Korte et al. | 260/898 |
| 4,133,788 | 1/1979 | Sahajpal et al. | 524/458 |
| 4,244,845 | 1/1981 | Woo | 524/458 |
| 4,254,004 | 3/1981 | Abbey | 524/458 |
| 4,263,193 | 4/1981 | Sakimoto et al. | 260/29.6 RB |
| 4,325,856 | 4/1982 | Ishikawa et al. | 523/201 |
| 4,409,355 | 10/1983 | Heimberg | 524/458 |
| 4,427,836 | 1/1984 | Kowalski et al. | 525/301 |
| 4,468,498 | 8/1984 | Kowalski et al. | 525/301 |
| 4,513,118 | 4/1985 | Suetterlin et al. | 525/81 |
| 4,539,361 | 9/1985 | Siol et al. | 524/460 |

OTHER PUBLICATIONS

L. H. Sperling, "Interpenetrating Polymer Networks and Related Materials", 1977, J. Polymer Sci., vol. 12, 141-180.

A. J. Curtivs et al, "Polybutadiene/Polystyrene Interpenatrating Polymer Networks", 1972, Polymer Eng. & Science, vol. 12, No. 2, 101-108.

Sperling et al, "Glass Transition Behavior of Latex Interpenetrating Polymer Networks Based on Methacrylic/Acrylic Pairs", 1973, J. Appl. Pol. Sc., vol. 17, 2443-2455.

Primary Examiner—Joseph L. Schofer
Assistant Examiner—N. Sarofim
Attorney, Agent, or Firm—Mitchell D. Bittman

[57] ABSTRACT

A process is provided which prepares an aqueous polymer emulsion containing an interpenetrating polymer network. This polymer emulsion is useful as a binder, adhesive or coating.

24 Claims, No Drawings

4,616,057

POLYMER EMULSION CONTAINING AN INTERPENETRATING POLYMER NETWORK

BACKGROUND OF THE INVENTION

This invention relates to a process for preparing a polymer emulsion containing colloidally suspended therein an interpenetrating polymer network wherein a first polymer network is intertwined on a molecular scale with a second polymer network and optionally additional polymer networks. The polymer emulsion of this invention is useful as binder of fibers or fabrics, especially fiberfill.

Fiberfill is a generic term used to describe a variety of nonwoven fabrics for a variety of end uses. The common feature of all fiberfill products is a measure of loft or thickness in the fabric. This loft is a characteristic of value because it imparts insulation to outerwear and bed quilt stuffing, cushioning in furniture padding, dust holding capacity to filter media and resiliency to scrubbing pads. The most common construction of a fiberfill product is a loosely garnetted, cross-lapped or air laid web of 6 to 30 denier polyester staple fibers which is bonded (locked in its particular fiber arrangement) by an emulsion polymer binder. Fiberfill products can be made with other fibers, e.g. polyamide, cellulose acetate, rayon, glass, alone or in blends with each other. Some fiberfill is sold without a bonding agent but the material will lack durability, tensile strength and resiliency when compared to a bonded product. Bonding methods other than emulsion polymers, such as needle punching, and meltable fibers and powders are also used, but the polymer emulsion method produces the optimum strength/loft ratios for the majority of fiberfill markets.

The polymer emulsion product used as the binder is usually one of the following chemical types: polyvinylacetate, acrylic copolymers, styrene-butadiene copolymers or polyvinylchloride. Polyvinylacetate is the most common binder and in recent years it has been made white enough and strong enough to replace most of the acrylic polymer traditionally used. Polyvinylchloride is used where flame resistance is of prime concern and styrene-butadiene copolymers are used for special rubbery applications.

The characteristic of initial loft is unaffected by the chemical type of the binder used. However, initial loft is not the loft of value. Fiberfill products in their normal use are compressed, reducing the initial loft, and released many times. The true value of loft is how thick the fiberfill web is after repeated compression/recovery cycles. One drawback of current polymer bonded fiberfill technology is that temperatures over 100° F. will soften the binder and cause the fiberfill product to permanently lose loft if it is compressed at this elevated termperature. Temperatures of up to 180° F. are encountered in the shipping and use of many fiberfill products. Typically a fiberfill product, which may lose only 15% of its initial loft if compressed and released at 80° F., will lose more than 80% of its loft if tested the same way at only 120° F. Higher termperatures are expected to even more dramatically damage this loft recovery.

The polymer emulsion prepared by the process of this invention provides a binder compound for fiberfill which provides improved resiliency and loft recovery to the bonded fiberfill products. This polymer emulsion is useful in bonding textile fibers in a fiberfill product or in any nonwoven product or even any traditional woven or knitted textile fabric.

SUMMARY OF THE INVENTION

Briefly, the present invention provides a process for preparing a polymer emulsion containing an interpenetrating polymer network by forming a first polymer emulsion, mixing a second monomer emulsion with the first polymer emulsion, allowing the emulsion mixture to equilibrate and polymerizing the emulsion mixture providing a first polymer network which is intertwined on a molecular scale with the second polymer network.

DETAILED DESCRIPTION OF THE INVENTION

The aqueous polymer emulsion containing an interpenetrating polymer network is prepared by forming a first polymer emulsion. The first polymer emulsion can be prepared by conventional batch, semi-continuous or continuous polymerization procedures. These are taught, for example in U.S. Pat. No. 2,754,280, 2,795,564, 3,732,184, and in the book entitled "The Applications of Synethetic Resin Emulsion" by H. Warson, Ernest Benn Limited, London, 1972, pp. 85 to 132. The first polymer emulsion can be formed by polymerizing a monomer or a mixture of monomers (herein called a first monomer) with an active crosslinking agent. Alternatively the first polymer emulsion can be formed by emulsifying a polymer.

The first polymer emulsion is mixed with a second monomer emulsion and then the emulsion mixture is allowed to equilibrate. By equilibration is meant allowing sufficient time for the second monomer to become absorbed into the first polymer. The mixing and equilibration allows the second monomer emulsion to be thoroughly mixed and dispersed throughout the first polymer emulsion on a molecular scale.

Then, after thorough mixing and equilibration the emulsion mixture is polymerized providing a first polymer network which is intertwined on a molecular scale with the second polymer network, i.e. an interpenetrating polymer network is formed. Optionally, a third monomer emulsion can then be mixed in, equilibrated, followed by polymerization or further additional monomer emulsions can likewise be intertwined in the polymer networks. When the polymer emulsion is subsequently applied, dried and heated the physical and chemical bonding of the first polymer network with the second polymer network is completed.

Because of the interpenetrating network formed, desirable physical properties are achieved. Dual Tg (glass transition termperature) properties have been observed wherein the polymer has the Tg of both the first polymer and the second polymer. This is especially useful in the application of the polymer emulsion wherein modulus, tensil strength and desirable film forming properties can be adjusted by varying the ratio of the first and second polymers comprised in the interpenetrating network. Because the first and second networks are intertwined on a molecular scale higher tensile strength has been observed as well as higher modulus and higher impact strength at termperatures intermediate the Tg's of the first polymer and the second polymer.

The monomers which are polymerized in accordance with the present invention are vinyl monomers, ethylenically unsaturated compounds. Examples of monoethylenically unsaturated monomers are: vinyl esters of alkanoic acids having from 1 to about 18 carbon atoms, such as vinyl formate, vinyl acetate, vinyl propionate, vinyl butyrate, vinyl isobutyrate, vinyl valerate, vinyl 2-ethylhexanoate, vinyl isooctanoate, vinyl nonoate, vinyl decanoate, vinyl pivalate, vinyl ester (e.g. Versatic Acid-TM, a branched carboxylic acid, marketed by the Shell Oil Corporation), vinyl laurate, and vinyl stearate; also alpha-olefins, such as ethylene, propylene, butylene, isobutylene, and pentene and the like; also maleate, fumarate, and itaconate esters of $C_1$–$C_8$ alcohols, such as dibutyl maleate, dibutyl fumarate, dibutyl itaconate; also alkyl acrylates with an alkyl group having from 1 to 18 carbon atoms, such as methyl, ethyl, n-butyl, sec-butyl, the various isomeric pentyl, hexyl, heptyl, and octyl (especially 2-ethylhexyl), lauryl, cetyl, stearyl and like groups; also alkyl esters of methacrylic acid with an alkyl group having from 1 to about 18 carbon atoms, such as methyl, ethyl, propyl, n-butyl, n-hexyl, 2-ethylhexyl, n-octyl, lauryl, cetyl, stearyl and like groups; also vinyl alkyl ethers, having an alkyl group with 1 to 18 carbon atoms, such as methyl vinyl ether, ethyl vinyl ether, butyl vinyl ether and stearyl vinyl ether. Examples of monomers also include diene monomers, such as butadiene, chloroprene, and isoprene and similar compounds. Other monomers include aromatic vinyl monomers, such as styrene, alphamethylstyrene, vinyl toluene, 2-bromostyrene, and p-chlorostyrene; also acrylonitrile; also vinyl halide monomers, such as vinyl chloride and vinylidene chloride; also benzly acrylate and t-butyl acrylate; also vinyl esters of aromatic acids, such as vinylbenzoate.

Preferably the polymer present in the first polymer emulsion is either polymethyl methacrylate, polyvinyl acetate, polystyrene or polyacrylo nitrile or copolymers of these with other monomers mentioned above, while the second polymer differs from the first polymer and preferably is based upon a monomer such as acrylo nitrile, methyl methacrylate, butyl acrylate, styrene or mixtures thereof. In order to obtain desirable dual Tg properties, the polymer in the first polymer emulsion and the polymer derived from the second monomer emulsion can be chosen so, for example, one has a Tg greater than the other. Different pairs of polymers can be chosen to exhibit useful properties over different temperature ranges. For example, because of polystyrene's higher Tg, upon interpenetrating a polyvinyl acetate network it will extend the modulus and reduce distortion of the matrix at elevated temperatures.

In general, the various combinations of monomers can be chosen for the first polymer emulsion or the second monomer emulsion. However, the monomer chosen for the first monomer emulsion cannot be an inhibitor to the polymerization of the monomer in the second monomer emulsion. Since acrylo nitrile is an inhibitor to the polymerization of vinyl acetate, the vinyl acetate must be in the first polymer emulsion while the acrylo nitrile is in the second monomer emulsion. Thus, in a preferred embodiment, the first polymer emulsion contains vinyl acetate or vinyl acetate-butylacrylate while the second monomer emulsion contains either styrene, methyl methacrylate, acrylo nitrile or acrylo nitrile-butylacrylate.

Advantageously, this process of the present invention provides a interpenetrating network of polymers which are generally physically incompatable in that the polymers are not soluble in one another. In addition, this process provides a means of combining polymers which cannot be formed by copolymerization of their monomers. For example, vinyl acetate and styrene cannot be copolymerized and mixing or blending of the two polymers does not result in a polymer having desirable properties (e.g. poor tensil strength).

The first polymer emulsion and optionally the second monomer emulsion contain an active crosslinking agent. By the term "active crosslinking agent" is meant a functional monomer which immediately provides crosslinking and branching of the polymer during the initial formation of the emulsion polymer to increase the molecular weight of the emulsion polymer. Subsequent drying or other curing techniques are not required for the crosslinking and branching of the emulsion polymer by the active crosslinking agent. Monomers of this type generally comprise compounds which contain 2 to 5 ethylenically unsaturated groups in one molecule separated by an ester or ether group, or by an aromatic or nitrogenous ring structure, where the unsaturated groups are capable of undergoing additonal polymerization by free radical means. Suitable active crosslinking agents include alkylene glycol diacrylates and methacrylates, such as ethylene glycol diacrylate, 1,3-butylene glycol diacrylate, propylkene glycol diacrylate, triethylene glycol dimethacrylate etc., 1,3-glycerol dimethacrylate, 1,1,1-trimethylol propane dimethacrylate, 1,1,1-trimethylol ethane diacrylate, pentaerythritol trimethacrylate, sorbitol pentamethacrylate, methylenebisacrylamide, methylene bismethacrylamide, divinyl benzene, vinyl methacrylate, vinyl crotonate, vinyl acrylate, divinyl adipate; also di- and tri-allyl compounds, such as triallyl cyanurate, triallyl isocyanurate, diallyl phthalate, allyl methacryalte, allyl acrylate, diallyl maleate, diallyl fumarate, diallyl itaconate, diallyl malonate, diallyl carbonate, triallyl citrate, triallyl aconitate; also divinyl ether, ethylene glycol divinyl ether and the like. The amount of active crosslinking agent in the polymer emulsion of the present invention is from about 0.01 to 0.5 percent, preferably from about 0.05 to 0.25 percent by weight of the polymer.

The first polymer emulsion or the second monomer emulsion, preferably both, additionally contain a latent crosslinking agent. By the term "latent crosslinking agent" is meant a polyfunctional monomer wherein a portion of the functionality enters into the polymerization with other monomers in the polymer emulsion, with the residual functionality causing crosslinking of the polymer upon the subsequent application of energy generally by applying heat, e.g. by drying and curing of the latex particles, often in the presence of a catalyst, or by applying radiation. The latent crosslinking agent provides thermosetting characteristics to the polymer emulsion. Upon the subsequent application of energy the latent crosslinking agent forms an insoluble crosslinking network, with the crosslinking being triggered generally by heat or radiation after the polymer emulsion has been formed and applied. Examples of latent crosslinking agents are: N-alkylolamides of alpha, beta ethylenically unsaturated carboxylic acids having 3–10 carbons, such as N-methylol acrylamide, N-ethanol acrylamide, N-propanol acrylamide, N-methylol methacrylamide, N-ethanol metacrylamide, N-methylol malemide, N-methylol maleamide, N-methylol maleamic acid, N-methylol maleamic acid esters; the N-alkylol amides of the vinyl aromatic acids, such as N-methylol-p-vinylbenzamide and the like; also N-(alkoxymethyl) acrylates and methacrylates, where the alkyl group has from 1–8 carbon atoms, such as N-(methoxymethyl) acrylamide, N-(butyoxymethyl) acrylamide, N-(methoxymethyl) methacrylamide, N-(butoxymethyl) allyl carbomate and N-(methoxymethyl) allyl carbamate, and mixtures of these monomers with allyl carbamate, acrylamide or methacrylamide. Epoxy containing monoethylenically unsaturated compounds, such as glycidyl acrylate, glycidyl methacrylate and vinyl glycidyl ether function as latent crosslinking monomers in conjunction with mono- and diethylenically unsaturated carboxylic acids, such as acrylic methacrylic and itaconic acid, when catalyzed with an alkaline catalyst, such as potassium or sodium carbonate, diethylenetriamine and the like. Hydroxyethyl acrylate, hydroxypropyl acrylate and the corresponding methacrylates provide latent crosslinking when combined with N-alkylolamides of alpha, beta ethylenically unsaturated acids having 3–10 carbon atoms or with the acids themselves by ester formation. Another group of latent crosslinking monomers is described in U.S. Pat. Nos. 3,678,098 and 4,009,314. These are cationic chlorohydrin compounds having the following formula:

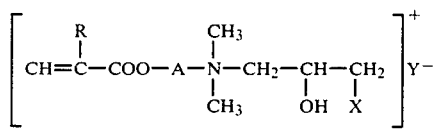

where R = methyl or H
A = alkylene
X,Y = halogen

The crosslinking reaction of these monomers is also catalyzed by the alkaline compounds mentioned above. The amount of latent crosslinking agent in the polymer of the present invention is about from 0.5 to 10 percent, preferably from about 2 to 6 percent by weight of the polymer.

The emulsions of the present invention are prepared in the presence of suitable anionic, cationic or nonionic emulsifiers or mixtures thereof. Optionally, protective colloids, illustrated by polyvinyl alcohol and hydroxyethyl cellulose, may also be present. Suitable nonionic emulsifying agents include alkylphenoxypolyethoxyethanols having alkyl groups of about 10to 60 carbon atoms and 10 to 6 or more oxyethylene units, such as octylphenoxypolyethoxyethanols, methyloctylphenoxypolyethoxyethanols, nonylphenoxypolyethoxyethanols, dodecylphenoxypolyethoxyethanols; also ethylene oxide derivatives of long chained carboxylic acids, such as lauric, myristic, palmitic, oleic, and stearic acid, containing 10 to 60 oxyethylene units per molecule; also analogous ethylene oxide condensates of long-chained alcohols, such as octyl, decyl, lauryl, stearyl and cetyl alcohols, ethylene oxide derivatives of etherified or esterified polyhydroxy compounds having a hydrophobic component, such as lauric, myristic, palmitic, oleic, and stearic acid, containing 10 to 60 oxyethylene units per molecule; also analogous ethylene oxide condensates of long-chained alcohols, such as octyl, decyl, lauryl, stearyl, and cetyl alcohols, ethylene oxide derivatives of etherified or esterified polyhydroxy compounds having a hydrophobic hydrocarbon chain, such as sorbitan monostearate containing 10 to 60 oxyethylene units; also block copolymers of ethylene oxide and propylene oxide comprising a hydrophobic propylene oxide section combined with one or more hydrophilic ethylene oxide sections. Suitable anionic emulsifying agents include higher fatty alcohol sulfates, such as sodium lauryl sulfate, the alkylaryl sulfonates, such as the sodium salt of t-octylphenyl sulfonate, the sodium dioctyl sulfosuccinates, disodium fatty alkyl alkanolamide sulfosuccinate, and the ammonium salt of a sulfate or phosphate ester of an alkylphenoxy poly(ethyleneoxy) ethanol, where the oxyethylene content is from 3 to 30 moles per alkylphenol. Suitable cationic emulsifiers include N-dodecyl trimethyl ammonium chloride, and N-vinyl benzyl trimethyl ammonium chloride and the like. Generally, the polymer emulsions of this invention contain from 1 to 10 percent, preferably from 3 to 6 percent, emulsifiers based on the weight of the monomers (solids).

In the polymerization process used in making the first polymer emulsion of the invention an aqueous phase is prepared first containing water, a small portion of a nonionic emulsifier, sometimes also mixture of anionic and nonionic emulsifiers, and a very small amount of ferrous sulfate, being a redox component in the finishing catalyst system for the polymer emulsion. The aqueous phase is purged well with nitrogen, and heated to polymerization temperatures (e.g. 60° to 70° C.). A small portion of monomer, is then added followed by a suitable amount of initial catalyst, most often from about 1 to 3 percent based on the weight of the initial monomer charge. Often it is advantageous to use potassium persulfate as the catalyst because the resulting polymer has better resistance to heat discoloration. But sodium or ammonium persulfates can also be used. After the emulsion polymerization has initiated, the rest of the monomers are gradually added to the reaction mixture, often emulsified in water together with the latent crosslinking agents and the active crosslinking agents. Generally, the gradual addition of the monomers is carried out over a time period of one to five hours. More catalyst solution is also added gradually to maintain the polymerization reaction. Often cooling is applied to the reaction vessel by means of a waterbath to remove the excess heat of polymerization. Usually, a total of 0.2 to 1 percent of catalyst based on the weight of the monomers, is added over the course of the emulsion polymerization. After all the monomer has been added optionally a small amount of an organic peroxide, such as t-butyl hydroperoxide and cumene hydroperoxide, and the like can be added for the finishing step, together with a small amount of a reducing agent, such as sodium metabisulfate, sodium formaldehyde sulfoxylate and zinc formaldehyde sulfoxylate. In place of an organic peroxide, hydrogen peroxide or persulfates, such as potassium, sodium or ammonium persulfates may also be used. The terminal catalyst necessary to finish the reaction is generally about 10 to 30 percent by weight of the total amount of catalyst consumed during the reaction. The reducing agent is ordinarily added in the necessary equivalent amount. Normally no buffering agent is required to keep the pH between 3 and 5. If necessary, dilute ammonia may be added from time to time to adjust the pH within those limits. Others auxiliary agents may be added to the finished polymer emulsion, such as defoamers, biocides and the like.

After the first polymer emulsion is cooled a second monomer emulsion is introduced into the reactor as fast as possible containing water, monomer or mixtures of monomers, emulsifier and a small amount of ferous sulfate (redox component). Following thorough mixing and equilibration (e.g. 10 to 60 minutes) of the first and second emulsions a second polymerization step is initiated by the addition of catalyst solution and then the reducing solution.

The polymer emulsion of this invention generally contains from 5 to 95%, preferably 20 to 80% on a solids by weight basis of the first polymer emulsion.

The polymer emulsions of the present invention are useful as binders, adhesives and coatings. These polymer emulsions when used as binders provide high temperature resiliency to bonded fiberfill products. The polymer emulsions are useful in bonding textile fibers in a fiberfill product or other nonwoven product or even in traditional woven or knitted textile fabrics. Generally, based on the weight of the fiberfill product the binder can comprise 2 to 50%.

EXAMPLE 1

A polymer emulsion is prepared as follows containing a polymer which is an interpenetrating network of polyvinyl acetate and polystyrene.

The following was charged to a 100 gal. (379 liter) stainless steel pilot reactor equipped with a variable agitator, temperature control system, feedpumps, means for purging the reactor with nitrogen, and a jacket for heating and cooling:

| Water | 140 lbs. (63.5 kg) |
|---|---|
| Triton X 305 (1) | 6 lbs. 10 oz. (3 kg) |
| Emcol K8300 (2) | 8 oz. (227 g) |

The contents of the reactor were heated to 67° C. after which the reactor was purged with nitrogen. After the heat-up and purge the following monomer was added to the reactor:

| Vinyl acetate | 26 lbs. (11.8 kg) |
|---|---|

This was followed by the addition of the initial catalyst solution:

| Water | 10 lbs. (4.5 kg) |
|---|---|
| Potassium persulfate | 8 oz. (227 g) |

The polymerization initiated within 5 minutes as indicated by a 2° C. rise in temperature of the reactor. The following first monomer emulsion, made up previously, was then added gradually by means of an addition pump at a rate of 1.56 lbs. (0.71 kg)/minute over a 3½ hour period:

| Water | 58 lbs. (26.3 kg) |
|---|---|
| Emcol K8300 (2) | 8 lbs. 8 oz. (3.9 kg) |
| Triton X 305 (1) | 2 lbs. 4 oz. (1.0 kg) |
| N—Methylol acrylamide (49%) | 19 lbs. (8.6 kg) |
| Acrylamide (50%) | 2 lbs. (0.9 kg) |
| Monoethylmaleate | 12 oz. (340 g) |
| JPS Sequesterent (5) | 5 oz. (142 g) |
| Vinyl acetate | 238 lbs. (108 kg) |
| Triallyl cyanurate | 5 oz. (142 g) |

The temperature of the reactor content was allowed to rise to 80° C. and was maintained there by the gradual addition at a rate of 0.362 lbs. (0.164 kg)/minute over a 3½ hour period of the following catalyst solution:

| Water | 75 lbs. (34 kg) |
|---|---|
| Potassium persulfate | 9 oz. (255 g) |

After 3½ hours, when all the first monomer emulsion and catalyst solution had been added to the reactor the following finishing catalyst solution was added:

| Water | 1 lb. (.45 kg) |
|---|---|
| Potassium persulfate | 2 oz. (57 g) |

The temperature of the batch was maintained at 80° C. for an additional 30 minutes, after which the first polymer emulsion was cooled to 60° C. At this point a second monomer emulsion was introduced into the reactor, as fast as possible, in about 10 minutes, and mixed with the first polymer emulsion. The second monomer emulsion had been prepared before containing:

| Water | 50 lbs. (22.7 kg) |
|---|---|
| Emcol K8300 (2) | 3 lbs. (1.4 kg) |
| Triton X 305 (1) | 3 lbs. (1.4 kg) |
| N—Methylol acrylamide (49%) | 5 lbs. (2.3 kg) |
| Styrene | 100 lbs. (45.4 kg) |
| Ferrous sulfate | 1 gram (28 g) |

The temperature of the reactor content was maintained at 60° C. and allowed to equilibrate (½ hour) while the reactor was again purged with nitrogen after which the following catalyst solution was added to the reactor:

| Water | 19 lbs. (8.6 kg) |
|---|---|
| Potassium persulfate | 1 lb. (0.5 kg) |
| t-butyl hydroperoxide | 8 oz. (227 g) |

The second polymerization step was initated by adding half of the following reducing solution:

| Water | 16 lbs. (7.3 kg) |
|---|---|
| Hydrosulfite AWC (3) | 6 oz. (170 g) |

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

| Water | 4 lbs. (1.8 kg) |
|---|---|
| Zinc nitrate solution in water 50% | 14 oz. (397 g) |
| Phosphoric acid | 7 oz. (198 g) | followed by a second post-add as follows:

| Water | 2 lbs. (0.9 kg) |
|---|---|
| Proxel GXL (4) | 1½ oz. (43 g) |
| Formaldehyde (37%) | 1½ oz. (43 g) |

A total of 55 lbs. (24.9 kg) of rinsewater was added to the emulsion for clean up of the pumps and lines.
Notes:
(1) Triton X 305 is a 70 percent solution in water of an octylphenoxypolyethoxyethanol containing 30 moles of oxyethanol per mole of octyl phenol. It is supplied by the Rohm & Haas Company.

(2) Emcol K8300 is a 40 percent solution in water of disodium fatty alkyl alkanolamide sulfosuccinate supplied by the Witco Chemical Company.

(3) Hydrosulfate AWC is a brand of sodium formaldehyde sulfoxylate supplied by the Diamond Shamrock Company.

(4) Proxel GXL is a biocide supplied by the ICI Company.

(5) JPS Sequesterant is a brand of diethylenetriamine pentaacetic acid supplied by the Intex Products Company.

The polymer emulsion thus obtained had the following properties:

| | |
|---|---|
| solids (30 min. at 130° C. drying) | 46.3% |
| pH | 3.5 |
| viscosity (Brookfield at 50 RPM) | 78 cps |
| intrinsic viscosity (measured in N—methyl pyrrolidone at (30° C.) (6) | 1.5 dl/g |
| particle size (by light transmission) (7) | 0.33 microns |

Notes:

(6) In measuring the intrinsic viscosity, a 1 ml sample of the polymer emulsion is added to 100 ml of N-methyl pyrrolidone, and the mixture is agitated and filtered. The flowtime of the solution so prepared is then compared at 30° C. with the flowtime of the N-methyl pyrrolidone solvent using a Ubbelohde viscometer (obtained from the Cannon Instrument Company) the relative viscosity is the fraction obtained by dividing the flowtime of the solution by the flowtime of the solvent. The Huggins equation is then used to calculate the intrinsic viscosity from the relative viscosity measurement and from the polymer solids content in grams per 100 ml of solution. The use of the Huggins equation for intrinsic viscosity calculations is described in detail in the "Encyclopedia for Polymer Science and Technology", (Wiley, New York, 1971) Vol. 15, page 634.

(7) The particle size was measured by light transmission using a Beckman spectrophotometer (Spectronic 20). The method is described in detail in "Official Digest of the Paint and Varnish Industry", February 1959, pages 200-213.

EXAMPLE 2

A polymer emulsion is prepared containing a polymer which is an interpenetrating network of polyvinyl acetate and polymethyl methacrylate.

The following was charged to a 100 gal. (379 liter) stainless steel pilot reactor equipped with a variable agitator, temperature control system, feedpumps, means for purging the reactor with nitrogen, and a jacket for heating and cooling:

| | |
|---|---|
| Water | 140 lbs. (63.5 kg) |
| Triton X 305 (1) | 6 lbs. 10 oz. (3 kg) |
| Emcol K8300 (2) | 8 oz. (227 g) |

The contents of the reactor were heated to 67° C. after which the reactor was purged with nitrogen. After the heat-up and purge the following monomer was added to the reactor:

| | |
|---|---|
| Vinyl acetate | 26 lbs. (11.8 kg) |

This was followed by the addition of the initial catalyst solution:

| | |
|---|---|
| Water | 10 lbs. (4.5 kg) |
| Potassium persulfate | 8 oz. (227 g) |

The polymerization initiated within 5 minutes as indicated by a 2° C. rise in temperature of the reactor. The following first monomer emulsion, made up previously, was then added gradually by means of an addition pump at a rate of 1.56 lbs. (71 kg)/minute over a 3½ hour period:

| | |
|---|---|
| Water | 58 lbs. (26.3 kg) |
| Emcol K8300 (2) | 8 lbs. 8 oz. (3.9 kg) |
| Triton X 305 (1) | 2 lbs. 4 oz. (1.0 kg) |
| N—Methylol acrylamide (49%) | 19 lbs. (8.6 kg) |
| Acrylamide (50%) | 2 lbs. (0.9 kg) |
| Monoethylmaleate | 12 oz. (340 g) |
| JPS Sequesterent (5) | 5 oz. (142 g) |
| Vinyl acetate | 238 lbs. (108 kg) |
| Triallyl cyanurate | 5 oz. (142 g) |

The temperature of the reactor content was allowed to rise to 80° C. and was maintained there by the gradual addition at a rate of 0.362 lbs. (0.164 kg)/minute over a 3½ hour period of the following catalyst solution:

| | |
|---|---|
| Water | 75 lbs. (34 kg) |
| Potassium persulfate | 9 oz. (225 g) |

After 3½ hours, when all the first monomer emulsion and catalyst solution had been added to the reactor the following finishing catalyst solution was added:

| | |
|---|---|
| Water | 1 lb. (.45 kg) |
| Potassium persulfate | 1¼ oz. (57 g) |

The temperature of the batch was maintained at 80° C. for an additional 30 minutes, after which the first polymer emulsion was cooled to 60° C. At this point a second monomer emulsion was introduced into the reactor as fast as possible, in about 10 minutes, and thoroughly mixed with the first polymer emulsion. The second monomer emulsion had been prepared before containing:

| | |
|---|---|
| Water | 50 lbs. (22.7 kg) |
| Emcol K8300 (2) | 3 lbs. (1.4 kg) |
| Triton X 305 (1) | 3 lbs. (1.4 kg) |
| N—Methylol acrylamide (49%) | 5 lbs. (2.3 kg) |
| Methyl methacrylate | 100 lbs. (45.4 kg) |
| Ferrous sulfate | 1 gram (28 g) |

The temperature of the reactor content was maintained at 60° C. and allowed to equilibrate (about ½ hour), while the reactor was again purged with nitrogen after which the following catalyst solution was added to the reactor:

| | |
|---|---|
| Water | 19 lbs. (8.6 kg) |

-continued

| | |
|---|---|
| Potassium persulfate | 1 lb. (0.5 kg) |
| t-butyl hydroperoxide | 8 oz. (227 g) |

The second polymerization step was initated by adding half of the following reducing solution:

| | |
|---|---|
| Water | 16 lbs. (7.3 kg) |
| Hydrosulfite AWC (3) | 6 oz. (170 g) |

The temperature of the batch increased rapidly to 80° C., at which point the other half of the reducing solution was added to the reactor. The temperature of the batch was then maintained at about 80° C. for an additional 30 minutes, after which the polymer emulsion was cooled to room temperature. The following post-add was then added:

| | |
|---|---|
| Water | 4 lbs. (1.8 kg) |
| Zinc nitrate solution in water 50% | 14 oz. (397 g) |
| Phosphoric acid | 7 oz. (198 g) | followed by a second post-add as follows:

| | |
|---|---|
| Water | 2 lbs. (0.9 kg) |
| Proxel GXL (4) | 1½ oz. (43 g) |
| Formaldehyde (37%) | 1½ oz. (43 g) |

A total of 60 lbs. (24.9 kg) of rinsewater was added to the emulsion for clean up of the pumps and lines. The polymer emulsion thus obtained had the following properties:

| | |
|---|---|
| solids (30 min at 130° C. drying) | 45.0% |
| pH | 4.0 |
| viscosity (Brookfield at 50 RPM) | 32 cps |
| intrinsic viscosity (measured in N—methyl pyrrolidone at 30° C.) (6) | 2.3 dl/g |
| particle size (by light transmission) (7) | 0.27 microns |

EXAMPLE 3

A typical fiberfill product for quilt stuffing was constructed of 6 denier 2" staple length polyester fiber with garnetted and crosslapped webs to a weight of 4 oz./yd². This web was then spray bonded with a commercially available polyvinylacetate emulsion polymer (SUNCRYL RW 41SP from Sun Chemical Corporation), and the polymer emulsion as prepared in Examples 1 and 2, producing a final fiberfill product composed of 82% fibers and 18% bonding polymer.

The binder mix is prepared in a tank by diluting the emulsions with water to a 22% nonvolatile content. This mix is pumped with reciprocating airless pumps at a pressure of 300 psi and delivered through spray nozzles of 0.018" diameter which traverse the polyester fiber web. The polyester web is passed under the traversing sprays so as to achieve a uniform application of the bonding mix. The web and applied mix are passed through a forced air oven to remove the water and coalesce the binder polymer onto the fibers. The web is turned over and the process repeated on the back side. Finally the web is passed through the oven a third time to cure the binder, rendering it durable and resistant to water and solvent interactions.

The residual loft value was simulated by the following test. Ten inch by ten inch squares of the fiberfill material are cut and stacked vertically. The height of this stack is measured ($H_1$). The stack is then compressed by placing weights on top of the stack. A typical weight of 20 pounds usually reduces the initial stack height by 50 to 75%. The stack is left in this compressed state for a period of time (1 hour is typical) at a stated temperature and then the weight is removed. The stack of fiberfill is allowed to recover for a further period of time (10 minutes is typical) and the height is again measured ($H_2$). The % recovery is stated as a ratio of the final height to the initial height:

$$\frac{H_2}{H_1} \times 100 = \% \text{ recovery}$$

Table 1 shows % recovery values of a 6 layer stack compressed with 0.2 psi (20 lbs. on a 10"×10" square) for 16 hours and then allowed to recover for 1 hour at the stated temperatures.

TABLE 1

| | Polyvinyl acetate | Example 2 | Example 1 |
|---|---|---|---|
| 72° F. | 85% | 85% | 85% |
| 110° F. | 37% | 46% | 59% |

Although all the binders are affected by temperature the polyvinyl acetate bonded fiberfill loses more loft at 110° F.

EXAMPLE 4

A more detailed study was made of the binder utilizing the polymer emulsion prepared in Example 1 on a slightly different fabric, a 50/50 blend of 6 and 15 denier polyester. Web preparation and bonding were similar to Example 3. Finished fiberfill weight for this furniture pad material was 18 oz/yd² with a fiber content of 81% and a binder content of 19%.

The same loft recovery test was conducted at 120° F. with compression for 6 hours under various compression loads and recovery measured both immediately and after 6 hours. Again the polymer of Example 1 shows considerably more loft recovery at this temperature under all compression loads as compared to a binder utilizing a polyvinyl acetate emulsion polymer (PVAC) as shown in Table 2.

TABLE 2

| Compression loading | 0.02 psi | | 0.05 psi | | 0.15 psi | |
|---|---|---|---|---|---|---|
| polymer type | PVAc | Example 1 | PVAc | Example 1 | PVAc | Example 1 |
| immediate recovery | 69% | 77% | 55% | 68% | 14% | 27% |
| 6 hour recovery | 69% | 80% | 58% | 70% | 16% | 29% |

What is claimed is:

1. Process for preparing an aqueous polymer emulsion comprising:
   (a) forming a first polymer emulsion containing an active crosslinking agent;
   (b) mixing a second monomer emulsion with the first polymer emulsion;
   (c) allowing the emulsion mixture to equilibrate; and
   (d) then polymerizing the emulsion mixture providing a first polymer network which is intertwined on a molecular scale with the second polymer network, wherein the second polymer differs from the first polymer and the first polymer comprises 5 to 95% on a solids by weight basis of the emulsion mixture.

2. Process of claim 1 wherein the first polymer emulsion is formed by polymerizing a first monomer emulsion.

3. Process claim 1 wherein the first polymer emulsion is formed by emulsifying a polymer.

4. Process of claim 1 wherein the first polymer emulsion comprises 20 to 80% on solids by weight basis of the emulsion mixture.

5. Process of claim 1 wherein the second monomer emulsion contains a crosslinking agent selected from the group consisting of an active crosslinking agent, a latent crosslinking agent, and mixture thereof.

6. Process of claim 5 wherein at least one of the first polymer emulsion and the second monomer emulsion contains a latent crosslinking monomer.

7. Process of claim 6 wherein the polymer in the first polymer emulsion is chosen from the group consisting of polymethyl methacrylate, polyvinyl acetate, polystyrene, polyacrylo nitrile and copolymers thereof.

8. Process of claim 7 wherein the monomer in the second monomer emulsion is chosen from the group consisting acrylo nitrile, methyl methacrylate, butylacrylate, styrene and mixtures thereof.

9. Process of claim 1 where in the first polymer emulsion is based upon a monomer which is not an inhibitor to polymerization of the monomer in the second monomer emulsion.

10. Process of claim 1 wherein the first polymer emulsion contains polyvinyl acetate and the second monomer emulsion contains a monomer selected for the group consisting of styrene, methyl methacrylate, butylacrylate, acrylonitrile and mixtures thereof.

11. Process of claim 1 wherein the first polymer emulsion is based upon a monomer which is incompatable with the monomer in the second monomer in the second monomer emulsion in that they cannot be copolymerized.

12. Process as in one of claims 1 or 5-11 further comprising applying the polymer emulsion to a substiate, then drying and heating to complete the bonding of the first and second networks.

13. The polymer emulsion prepared by the process as in any of claim 1 or 5-11.

14. Process of claim 13 wherein the polymer emulsion is applied to a substrate as a binder, adhesive or coating.

15. Process of claim 14 wherein the polymer emulsion is applied to a substrate chosen from the group consisting of textile fibers, non-woven fabrics, woven fabrics and knitted textile fabrics.

16. The product prepared by the process of claim 14.

17. A fiberfill product comprising a fiberfill bound by a binder comprising an aqueous polymer emulsion containing a first polymer network containing an active crosslinking agent which is intertwined on a molecular scale with a second polymer network, wherein the second polymer differs from the first polymer and the first polymer comprises 5 to 95% on a solids by weight basis of the emulsion mixture.

18. Product of claim 17 wherein the polymer of the first polymer network is chosen from the group consisting of polymethyl methacrylate, polyvinyl acetate, polystyrene, polyacrylo nitrile and copolymers thereof.

19. Product of claim 18 wherein the polymer of the second polymer network is different from the first polymer and is chosen from the group consisting of polyacrylo nitrile, polymethyl methacrylate, polybutylacrylate, polystyrene and copolymers thereof.

20. Product of claim 17 wherein the first polymer and second polymer are incompatable in that they cannot be copolymerized.

21. An aqueous polymer emulsion comprising: a first polymer network containing an active crosslinking agent which is intertwined on a molecular scale with a second polymer network, wherein the second polymer differs from the first polymer and the first polymer comprises 5 to 95% on a solids by weight basis of the emulsion mixture.

22. Polymer emulsion of claim 21 wherein the polymer of the first polymer network is chosen from the group consisting of polymethyl methacrylate, polyvinyl acetate, polystyrene, polyacrylo nitrile and copolymers thereof.

23. Product of claim 22 wherein the polymer of the second polymer network is different from the first polymer and is chosen from the group consisting of polyacrylo nitrile, polymethyl methacrylate, polybutylacrylate, polystyrene and copolymers thereof.

24. Product of claim 21 wherein the first polymer and second polymer are incompatable in that they cannot be copolymerized.

* * * * *